March 4, 1969     M. J. PRIEFERT     3,431,005
VERTICAL BUMPER GUARD ATTACHMENT
Filed Aug. 25, 1967
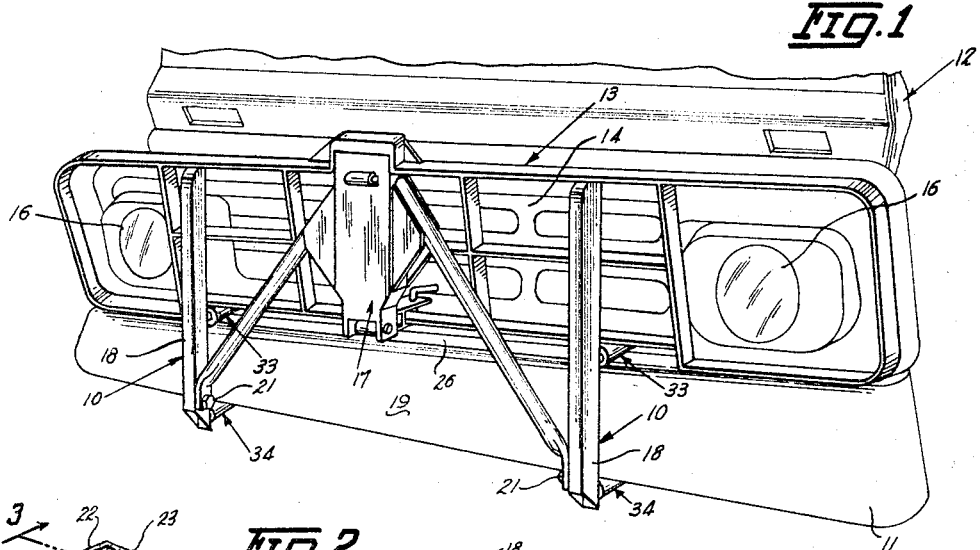
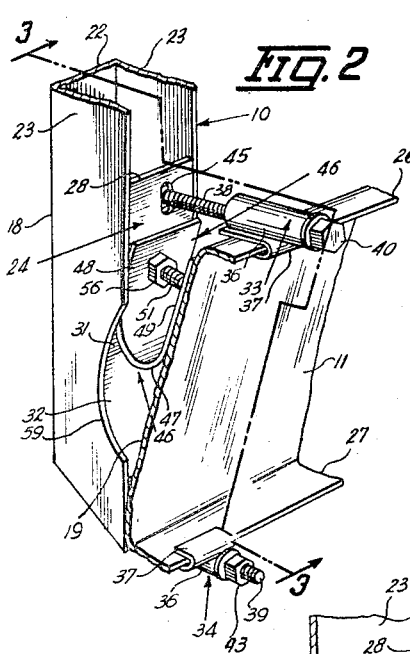
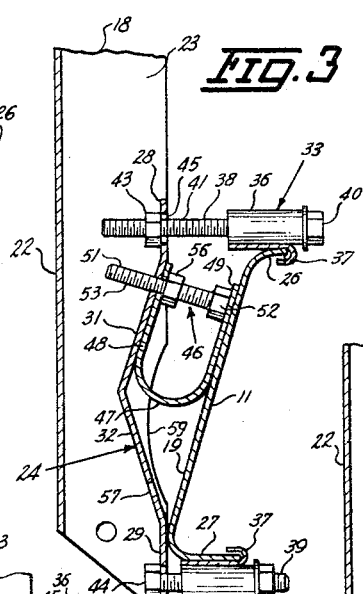
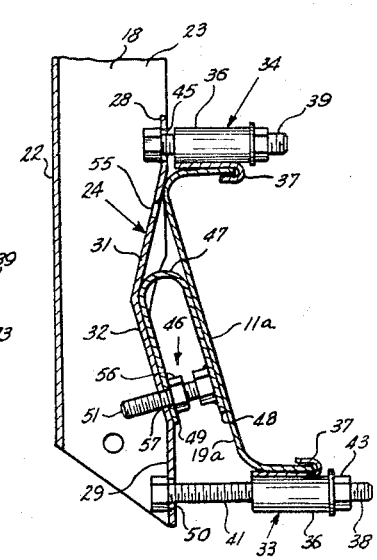
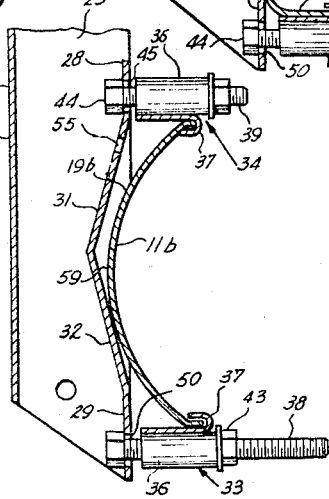
INVENTOR.
MARVIN J. PRIEFERT
BY
ATTORNEY.

United States Patent Office 3,431,005
Patented Mar. 4, 1969

3,431,005
VERTICAL BUMPER GUARD ATTACHMENT
Marvin J. Priefert, R.R. 1, Mount Pleasant, Tex. 75455
Filed Aug. 25, 1967, Ser. No. 663,392
U.S. Cl. 293—65                               6 Claims
Int. Cl. B60r 19/04, 27/00

ABSTRACT OF THE DISCLOSURE

The bumper attachment includes a mounting member for a tow hitch wherein the mounting member is extended transversely of an adjacent to the bumper outer face. Opposite the outer face, the mounting member is formed with a longitudinally extended recess or indented section of a length only a little shorter than the width of the bumper. The bottom surface of the recess faces the bumper outer face and includes a pair of reversely inclined sections that converge together at a junction outwardly from the bumper outer face. A clamping unit attached to the mounting member adjacent each end of the recess is connectable with a corresponding edge of the bumper. Located between the bottom surface of the recess and the bumper outer face is an adjustable abutment means, the adjustment of which predetermines the angle of attachment of the mounting member relative to the bumper.

Summary of the invention

The invention provides a bumper attachment having a mounting member adapted to support a tow hitch, coupler member or the like, wherein the angle of the mounting member relative to the bumper may be predetermined. The mounting member is attachable to the bumper by a pair of clamp units. An irregular surface of the mounting member opposite to and facing the bumper outer face provides a variable surface support for one end of an adjustable abutment means, the other end of which is in bearing engagement with the bumper outer face. By selectively locating the abutment means transversely of the bumper and adjusting the extended length thereof between the bumper outer face and irregular surface on the mounting member, the mounting member is capable of being easily clamped to bumpers of different shapes and sizes in transverse cross section for support at a predetermined angle relative to the bumper.

Detailed description of the invention

Further objects, features and advantages of the invention will become apparent from the following description when taken in connection with the accompanying drawings wherein:

FIG. 1 is a perspective view of the front portion of a vehicle showing the bumper attachment of this invention in assembly relation therewith for supporting a tow hitch;

FIG. 2 is an enlarged detailed perspective view of the bumper attachment shown in assembly relation with a bumper having an upwardly and rearwardly inclined outer face;

FIG. 3 is a sectional view taken substantially along the line 3—3 in FIG. 2;

FIG. 4 is a sectional view illustrated similarly to FIG. 3 showing the bumper attachment in assembly relation with a bumper that has a downwardly and rearwardly inclined face; and FIG. 5 is a sectional view illustrated similarly to FIG. 3 and shows the bumper attachment in assembly relation with a bumper that has a convex outer surface.

Referring to FIG. 1 of the drawings a pair of bumper attachments of this invention are indicated generally at 10 in assembly relation with a front bumper 11 of a vehicle 12. As shown, the attachments 10 are utilized to support a combination guard structure 13 for the vehicle grill 14 and headlights 16 and a collapsible tow hitch 17. It is to be understood, however, that a bumper attachment 10 may be used, with but a slight modification of the mounting member 18 thereof, to support a hitch coupling member, a cycle carrier or the like.

Since each bumper attachment 10 is of a like construction and similarly assembled with the vehicle bumper 11, only one thereof will be described in detail with like numbers being applied to corresponding parts.

As shown in FIGS. 1 and 2 a bumper attachment 10 includes the mounting member 18 which is arranged transversely of and adjacent to the bumper outer face 19. In FIG. 1 the mounting members 18 are illustrated as projected upwardly from the bumper 11 to constitute an upright standard to which the grill structure 13 is secured as by welding or like suitable means. The tow hitch 17 is pivotally connected at 21 to the lower ends of the mounting members 18 for pivotal movement to an upright storage position to form a part of the guard structure 13 and to a forwardly extended operating position.

The mounting member 18 is of a channel shape in transverse cross section (FIG. 2) formed with a base section 22 and leg sections 23 so as to be open to the bumper outer face 19 with the base section 22 located forwardly of the bumper. Positioned between and secured to the leg sections 23 is a longitudinally extended plate member 24 (FIGS. 2 and 3) of a length to extend outwardly beyond the bumper outer edges 26 and 27. The plate member 24 has flat end portions 28 and 29 at the free ends of the leg sections 23 located substantially opposite corresponding upper and lower outer edges 26 and 27, respectively, of the bumper 11.

The central section of the plate member 24, located between the flat end portions 28 and 29, is comprised of a pair of reversely inclined portions 31 and 32 of substantially equal length which converge together in a direction toward the base section 22. The plate member 24 and those parts of the leg sections 23 extended rearwardly from the reversely inclined portions 31 and 32 form a longitudinally extended recess or pocket in the mounting member 18 having a reversely inclined or indented bottom surface for a purpose to appear later.

A pair of clamping units 33 and 34 corresponding to the end portions 28 and 29, respectively, each includes a cylindrical sleeve or spacer member 36 having a longitudinally extended hook 37 secured to its outer peripheral surface for hooked engagement with the corresponding adjacent outer edges 26 and 27 of the bumper 11.

As illustrated in FIGS. 1, 2 and 3, the bumper 11 has the outer face 19 thereof inclined upwardly and rearwardly so that its upper edge 26 is located rearwardly of the lower edge 27. The clamping units 33 and 34 therefor have bolts 38 and 39, respectively, extendible through the sleeves 36 with the bolt 38 being of the greater length than the bolt 39 to provide for the hooked engagement of the hook 37 of the clamping unit 33 with the bumper edge 26. The bolt 38 (FIG. 3) for the clamping unit 33 has the head 40 thereof in abutting engagement with the rear end of the sleeve 36 and its threaded shank 41 projected through a slotted opening 45 formed in the plate member end portion 28. A clamping nut 43 is threadable on the shank 41 for bearing engagement with the forward or inner side of the end portion 28.

In the clamping unit 34 the bolt 39 is extended through a slotted opening 50 in the end portion 29 of the plate member 24 and through the sleeve 36 with its head 44 bearing against the end portion 29 and a clamping nut 43 bearing against the rear end of the sleeve 36. On tightening of the clamping units 33 and 34 the mounting member 18 is drawn or moved to a secured position on the bumper 11. In this connection it is to be noted that the slotted openings 45 and 50 in the end portions 28 and 29, respectively, provides for a location of the clamping units 33 and 34 to accommodate bumpers of different widths.

To secure the mounting member 18 in a predetermined angular relation with the bumper 11 there is provided an adjustable abutment means, indicated generally at 46, located between and in bearing engagement with the bumper outer face 19 and the plate member 24. The abutment means 46 includes a U-shape body member 47 formed from a flat metal material, and having legs 48 and 49. A bolt 51 has its head end 52 welded to the inside and adjacent to the free end of the leg 49 with its threaded shank 53 extended through the leg 48 and through an opening 55 (FIG. 4) formed in the inclined portion 31 of the plate member 24. A nut 56 is carried on the shank 53 between the legs 48 and 49 for bearing engagement against the leg 48.

With the bolt 51 extended through the opening 55 in the inclined portion 31, the legs 48 and 49 of the body member 47 are positioned in a back-to-back relation with the inclined portion 31 and bumper outer face 19, respectively. On adjustment of the nut 56 the body member 47 provides for a positive bearing support for the head end 52 of the bolt 51 against slippage relative to the bumper outer face 19. In this same connection it is to be noted that the leg 48 of the body member 47 is held between the leg sections 23 of the mounting member 18 against movement laterally of the mounting member.

With the end portion 29 of the plate member 24 drawn into engagement with the lower side of the bumper 11 by the clamping unit 34, the nut 56 is adjusted to position the mounting member 18 at a predetermined angle relative to the bumper 11. This angular relation is maintained on tightening of the clamping unit 33.

When a bumper 11a, as illustrated in FIG. 4, has a bumper outer face 19a that is inclined downwardly and rearwardly, the clamping units 33 and 34 are reversed relative to their showing in FIG. 3 and the end portion 28 of the plate member 24 is held by the clamping unit 34 in engagement with the upper side of the bumper 11a. Likewise, the adjustable abutment means 46 is reversed relative to its showing in FIG. 3 and the bolt 51 thereof inserted through an opening 57 (FIG. 3) so that the leg 49 of the body member 47 (FIG. 4) is in a back-to-back relation with the inclined portion 32 of the plate member 24. Adjustment of the nut 56 to set the mounting member 18 at a predetermined angle relative to the bumper 11a is then made after which the clamping unit 33 is tightened to firmly secure the mounting member 18 to the bumper 11a.

In FIG. 5 the bumper 11b is of a concavo-convex shape in transverse section, with its convex side 19b faced forwardly. The mounting member 18 at the longitudinally extended recess therein has the leg sections 23 cut away to form arcuate surfaces 59 of a size and shape corresponding substantially to the transverse curvature of the bumper 11b. The adjustable abutment means 46 is removed and the arcuate surfaces 59 are positioned in bearing engagement with the bumper outer face 19b.

The clamping units 33 and 34 are then partially tightened to permit frictional movement of the mounting member 18 relative to the bumper outer face 19b to provide for a setting of the mounting member at a predetermined angle relative to the bumper 11b. When this angular relation is reached the clamping units are drawn tight to securely fasten the mounting member 18 to the bumper 11b.

For a bumper having a vertically extended outer face the leg sections 23 of the mounting member 18 would directly engage such outer face. The mounting member 18 would then be secured to the vertically extended bumper in all respects similar to its securement to the bumper 11b as described in connection with FIG. 4.

Although the invention has been described with respect to a preferred embodiment thereof it is to be understood that it is not to be so limited since changes can be made therein which are within the full intended scope of this invention as defined by the appended claims.

I claim:
1. An attachment for a vehicle bumper comprising:
   (a) a mounting member of a channel shape extended transversely of the bumper having leg sections and located adjacent to and open to the outer face of the bumper,
   (b) an elongated plate member extended between and secured to said leg sections having end portions and an intermediate portion,
   (c) a pair of adjustable clamping units corresponding to said end portions, each clamping unit extended laterally from a corresponding end portion transversely of an adjacent outer edge of the bumper and including a hook interengageable with such adjacent outer edge of the bumper, and
   (d) an adjustable abutment means located between and engageable with said intermediate portion of the plate member and bumper outer face to position said mounting member at an angle relative to the bumper determined by the adjustment of said abutment means and clamping units.

2. A bumper attachment for a vehicle bumper according to claim 1, wherein:
   (a) each clamping unit includes a bolt having a threaded shank, a sleeve mounted on said shank for axial and rotational movement relative thereto, and a hook member secured to a side portion of said sleeve, said bolt having one end attached to a corresponding end portion of said plate member and extended adjacent an outer edge of said bumper to provide for the interlocked engagement of the hook member with said bumper outer edge whereby on tightening of said clamping units said plate member is moved toward the bumper outer face into abutting engagement with said abutment means.

3. An attachment for the bumper of a vehicle according to claim 1, wherein:
   (a) said abutment means includes a leg portion, secured to said plate member and positioned against said bumper outer face,
   (b) a bolt secured to the inner surface and adjacent the free end of said leg portion and loosely extended through said intermediate portion of the plate member, and
   (c) a nut threadable on said bolt to vary the length of said bolt between said leg portion and intermediate portion.

4. A bumper attachment for a vehicle bumper comprising:
   (a) a mounting member extended transversely of the bumper adjacent the outer face thereof, said mounting member having a recessed portion of a length substantially equal to the width of the bumper and a bottom wall facing said bumper outer face,
   (b) a pair of adjustable clamping units on said mounting member extended transversely of and adjacent corresponding outer edges of said bumper, each clamping unit including a hook member interengageable with a corresponding bumper outer edge,
   (c) adjustable abutment means located between and engageable with said bumper outer face and a portion of said bottom wall to position said mounting member at an angle relative to the bumper determined by the adjustment of said abutment means and clamping units, and
   (d) coacting means on said bottom wall and abutment means for holding said abutment means in a fixed position on said bottom wall.

5. A bumper attachment according to claim 4, wherein:
(a) said abutment means includes a U-shape member having a pair of leg portions one of which is in a back-to-back relation with the bumper outer face, and the other of which is in a back-to-back relation with said portion of the bottom wall, and
(b) adjustable means for holding said leg sections in a spread apart position.

6. A bumper attachment according to claim 4, wherein:
(a) said bottom wall comprises a pair of reversely inclined sections, with each section inclined inwardly of said recessed portion in a direction longitudinally thereof.

References Cited

UNITED STATES PATENTS

| | | | |
|---|---|---|---|
| 2,145,814 | 1/1939 | McAdams | 293—66 |
| 2,265,763 | 12/1941 | Paddock | 293—65 |
| 2,283,436 | 5/1942 | Hawkins | 293—69 X |
| 2,399,810 | 5/1946 | Ketcham | 280—491 |
| 2,717,798 | 9/1955 | Dodt et al. | 293—73 X |
| 3,287,027 | 11/1966 | Schuckman | 293—64 X |

ARTHUR L. LA POINT, *Primary Examiner.*

HOWARD BELTRAN, *Assistant Examiner.*

U.S. Cl. X.R.

280—491; 293—69, 99